Oct. 11, 1955   E. V. RUPP ET AL   2,720,214
RELIEF VALVE MANIFOLD
Filed Feb. 19, 1953   3 Sheets-Sheet 1

INVENTORS
Earl V. Rupp
BY Harry N. Shaw
Watson D. Harbaugh

Oct. 11, 1955     E. V. RUPP ET AL     2,720,214
RELIEF VALVE MANIFOLD
Filed Feb. 19, 1953     3 Sheets-Sheet 3
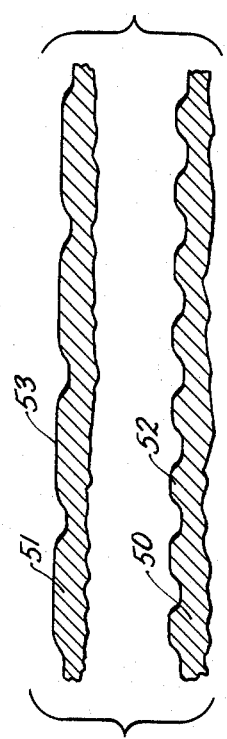
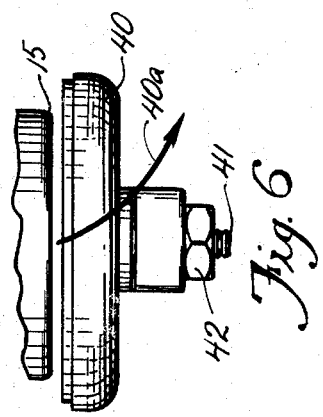
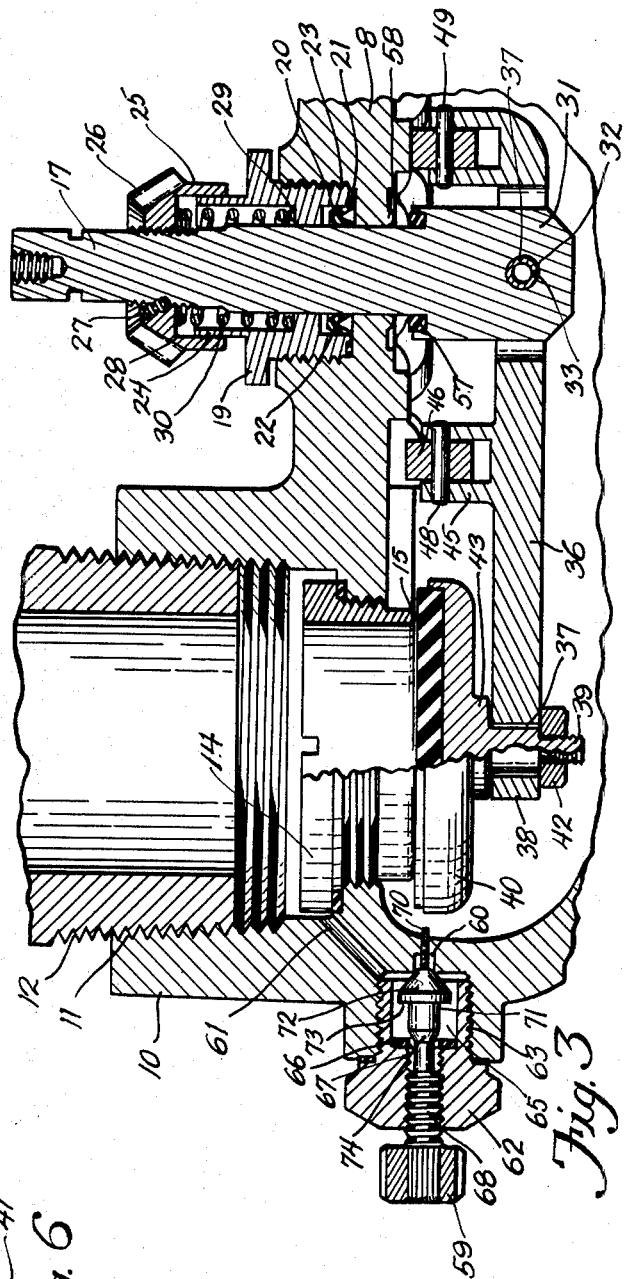
INVENTORS
*Earl V. Rupp*
BY *Harry N. Shaw*

United States Patent Office 2,720,214
Patented Oct. 11, 1955

2,720,214

RELIEF VALVE MANIFOLD

Earl V. Rupp, Chicago, and Harry N. Shaw, Wauconda, Ill., assignors to The Bastian-Blessing Company, Chicago, Ill., a corporation of Illinois Application February 19, 1953, Serial No. 337,716

12 Claims. (Cl. 137—315)

This invention relates to relief valve manifolds as applied to large storage tanks for gas, particularly liquified petroleum gas.

It has been the practice to install a plurality of relief valves on these tanks. Such installations, however, become hazardous and wasteful in the loss of gas, when at certain times the relief valves become defective and need replacement. There have been attempts to combine these valves into a satisfactory manifold arrangement to overcome replacement difficulties. The resulting constructions, however, have been complicated, difficult to operate and otherwise unsatisfactory from safety and servicing viewpoints.

It is the primary object of this invention to provide an improved compact relief valve manifold by which a plurality of pressure relief valves can be serviced quickly with complete safety.

One of the objects of the invention is to provide an improved relief valve manifold whereby any one of a plurality of relief valves can be selectively closed off quickly and safely at will whenever servicing thereof becomes necessary.

A further object of this invention is to provide an improved relief valve manifold with a plurality of relief valves wherein only one of the relief valves may be closed off at a time and the conduit to such relief valve cannot be again opened until a new valve or a repaired old valve is in place and properly functioning.

Another object of this invention is to provide an improved relief valve manifold with a plurality of relief valves having the minimum amount of restriction to flow between the connection to gas tank and the valves.

Another object is to provide a selective mechanism which will accommodate with equal facility possible variations between the height and size of a group of removable valve like parts with sufficient tolerance in throw distance to permit removal of port elements if so required in an emergency.

A more specific object of this invention is to provide a relief valve manifold with a plurality of relief valves and selection valving mechanism to positively seal the passage to any one of the relief valves when it becomes necessary to repair or replace that particular relief valve and the seal cannot be broken until the closure of the passage is accomplished in an acceptable way.

With the foregoing and other objects in view, this invention resides in the following specification and appended claims, certain embodiments and details of construction of which are illustrated in the accompanying drawings, in which—

Fig. 3 is a further enlarged sectional view in side elevation of a portion of the relief valve manifold showing the sealing valve in closed position;

Fig. 6 is a detail view in side elevation of the sealing valve and its seat with an arrow to indicate the path of valve movement; and Fig. 7 is a diagrammatic layout view of the cam raceways provided for controlling the position of the sealing valve mechanism.

Figure 1:
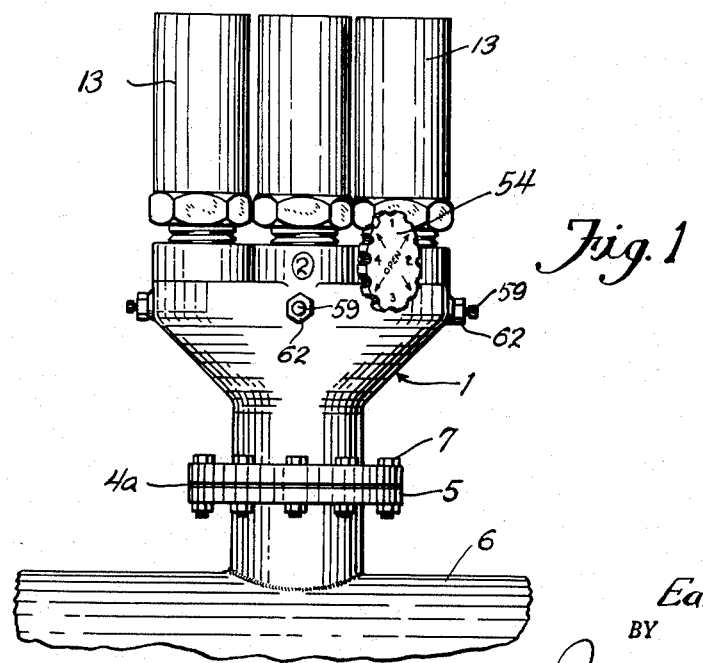
Fig. 1 is a view in side elevation of the relief valve manifold with the relief valves installed and the manifold itself secured to a gas storage tank.

Referring more particularly to Fig. 1, a relief valve manifold generally referred to at 1 is illustrated having an enlarged body portion 2 with a throat section 3 extending therefrom. Integrally formed with the manifold 1 and the extremity of the throat section 3 is a mounting flange 4. The flange 4 mates with a similar flange 5 on the tank 6, the two flanges being secured together by through bolts 7 with a suitable sealing means 4A therebetween.

Figure 2:
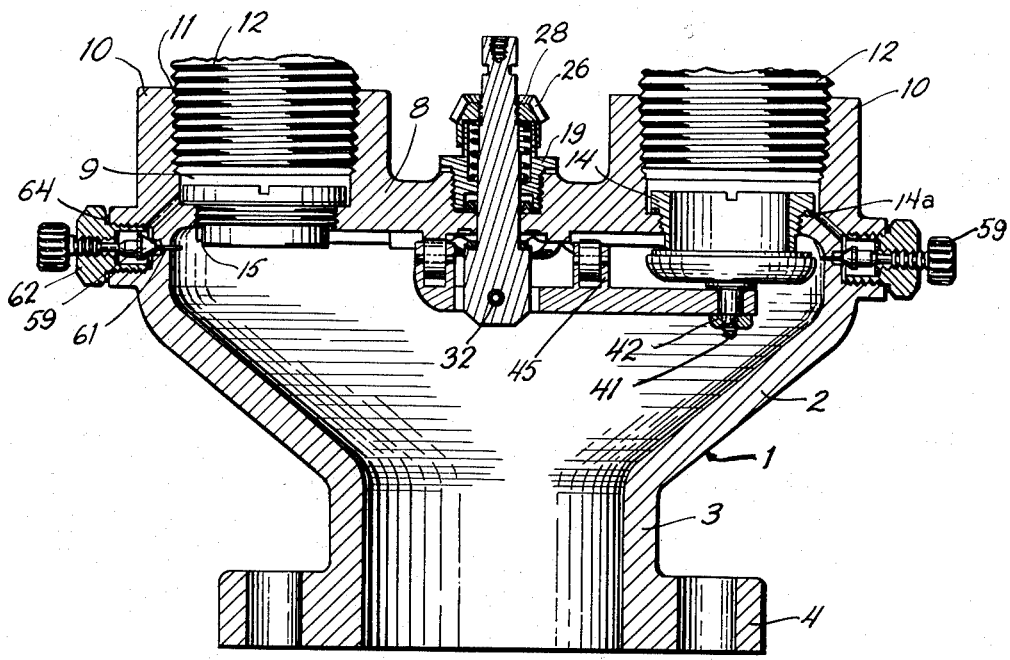
Fig. 2 is an enlarged sectional view in side elevation of the relief valve manifold with only the threaded end portions of the relief valves being illustrated.

The manifold, as viewed in Figs. 1 and 2, is provided with an integral end member or wall 8. End wall 8 is provided with a plurality of passages 9, each extending through a relief valve mounting boss 10. The bosses 10 are internally threaded at 11 to receive similar threads 12 on the lower ends of relief valves 13, as will be best seen in Figs. 3 and 4. A threaded bushing 14 is removably secured into the wall 8 at the inner extremity of each passage 9 as sealed by a gasket 14A. The bushings 14 extend through the wall 8 far enough beyond a flat surface surrounding them on the inner side that their machined end surfaces 15 may act as valve seats, as will be later described.

Figure 4:
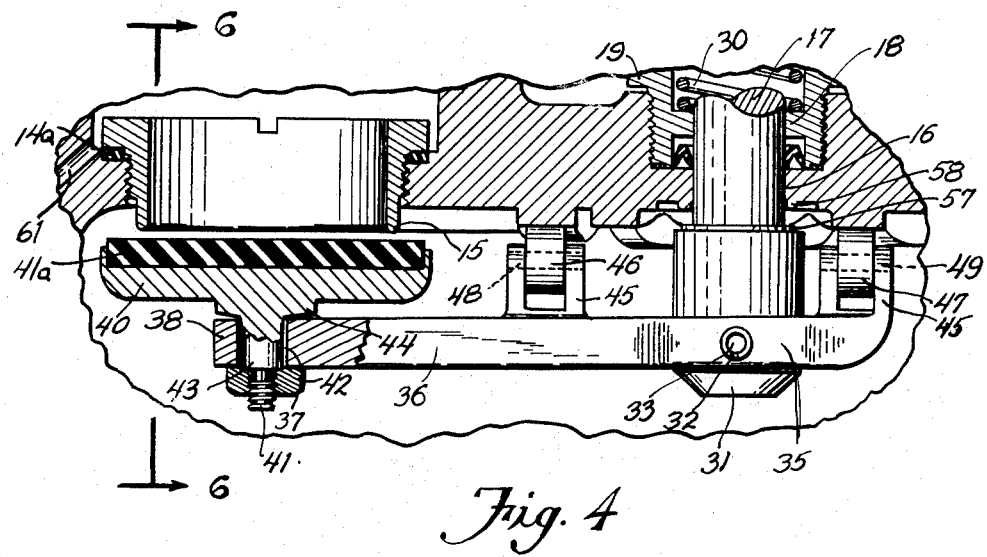
Fig. 4 is a sectional view in side elevation of a portion of the relief valve manifold illustrating the sealing valve in a partially open position.

Referring now particularly to Figs. 3 and 4, it is seen that the wall 8 is centrally bored to provide a circular passage 16 for valve stem 17. The stem 17 is guided vertically by the decreased diameter section 18 of a bushing 19 threaded into the wall 8. A rubber packing 20, partially V-shaped, when viewed in section, and having an outwardly extending portion 21, provides a flexible seal between the stem 17 and wall 8. The inner portion 22 of the packing grips the stem 17 while permitting longitudinal and rotary motion of the stem, while the portion 21 contacts end member 8. An upstanding neck 24 is provided on bushing 19 to receive in telescopic relation the depending skirt 25 of a bevel gear 26. The gear 26 is locked to stem 17 by a set screw 27 at their mating thread portions. Interposed between the under surface 28 of gear 26 and the upper surface 29 of reduced diameter section 18 of bushing 19, is a compression spring 30 which acts to normally bias the stem 17 upwardly.

Figure 5:
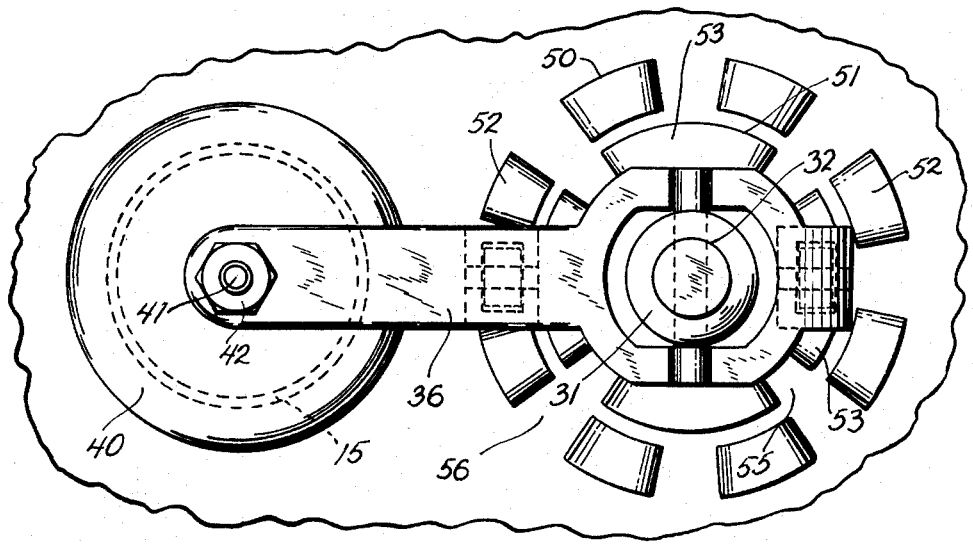
Fig. 5 is a bottom plan view of the sealing valve mechanism of the relief valve manifold.

The headed section 31 of valve stem 17, as seen best in Figs. 3 and 5, is provided with a circular passage 32 to accommodate a pivot pin 33 of slightly smaller diameter. The pin 33 projects from either side of section 31 and is secured at its ends by suitable means such as brazing or compression pressure to the bail arms 34 and 35 of valve lever 36. A hole 37 is provided near one end 38 of lever 36 to receive the head 39 of valve disk 40. The head 39 is of smaller diameter than the hole 37. A depending threaded stem 41 is provided on head 39 to receive a nut 42. The nut 42 abuts the shoulder 43 of head 39 at the innermost thread of stem 41. The disk 40 is further provided with a depending section between it and the head 39, this section having a considerably larger diameter than the hole 37 and having an outwardly and upwardly sloping surface 44. The aforedescribed connections between the disk 40 and the lever 36 provide a limited pivotal fit for the disk 40. In this manner a good seating relationship is assured between the end surfaces or valve seats 15 and the valve disk 40 during valve actuation to the closed position. The disk 40 is provided with a resilient seating material 41 to assure a tight seal with seats 15.

The lever 36 is provided with integral upstanding arms 45 which rotatably support rollers 46 and 47 by means of axles 48 and 49. The roller 46 is positioned radially further outward from the pivot pin 33 than is roller 47. In the path of movement of roller 46 is a cam raceway 50 having a series of cams 52. In the path of movement of roller 47 is a second cam raceway 51 having a series of cams 53. As will be seen in Figs. 5 and 7, the cams 52 and 53 of the raceways 50 and 51 respectively, are different in number and size. The inner raceway 51 may be designated as the engaging raceway, while the outer raceway 50 may be designated the positioning raceway. The cams 53 are positioned directly opposite the head section 31 of the stem from the relief valve passage sought to be closed off. The cams 52 are positioned so as to permit seating between the disk 40 on seats 15 when roller 47 fully engages on a cam 53. The cams 52 also provide an intermediate stop position between relief valve passages for the period when no relief valve replacement or repair is necessary.

When it is necessary to work on one of the relief valves, a rotatable handle 54 (Fig. 1), the details of which are not shown, is provided with suitable indicia to rotate the valve stem 17 through bevel gear 26. A handle could be provided directly on the end of stem 17 but this may not be as convenient or as safe to the repairman.

Assuming the handle to be in an intermediate or open position, then rollers 46 and 47 would be in positions 55 and 56, as seen in Fig. 5. In these positions, the valve stem 17 is biased fully upward by spring 30 and a disk 57 about stem 17 is engaged with a lip 58 on end member 8 to further guard against gas leakage.

Rotation of the stem 17 by handle 54 to move valve disk 40 to a closing position, is precisely controlled by the cams and rollers. Thus, on being moved counter-clockwise from position 55 on raceway 50 (Fig. 5) roller 46 will contact a cam 52. The roller 47 will, at the same time, contact a cam 53 in raceway 51. This engagement by the rollers with the cams, forces the valve stem 17 downwardly as viewed in Figs. 3, 4 and 5. The lever 36 and the valve disk 40, being pivotally interconnected with the stem, are also moved downwardly while at the same time they are being rotated toward a closing position. Upon continued rotation of stem 17 by handle 54 toward the closing position for disk 40, the roller 46 will move to a position on raceway 50 between two of the cams 52. Roller 47 meanwhile continues to engage the relatively longer cam 53. Spring 30, acting on the stem 17, will at this point pivot the lever 36 about the contact point between roller 47 and cam 53 as an axis to cause disk 40 to firmly engage a valve seat 15.

When the repair of the relief valve has been completed, a rotation of the handle 54, in either direction, will cause the valve disk 40 to take a downward and outward or lateral movement as indicated by the arrow 40A in Fig. 6. This downward movement is obviously caused by re-engagement of the roller 46 with a cam 52. Thus, it is seen that the valve disk 40 may be moved into any one of a plurality of selected engaged and disengaged positions about and adjacent to the inner surface of end member 8.

In order to control the significant pressures above the valve disk 40, a double acting valve 59 is provided which comprises a threaded gland nut 62 threaded into the body 1 as at 63 with a washer 64 to seal the threaded relationship. The nut 62 has a valve cavity at 65 with a valve seat washer 66 surrounding the mouth of a threaded opening 67 in which the threaded shank 68 of the valve 59 is mounted.

At its inner end the valve 59 has a guide pin 70 coaxial with a restricted passage 60 leading to the upstream side of the valve disk 40. Intermediate the guide pin and threaded portion of the valve, the valve stem is enlarged as at 71 to have a large conical taper 72 on the guide pin side which seals against the inner mouth of the passage 60. Behind the conical taper the enlarged portion 71 is reduced to provide an outwardly facing shoulder 73 co-operating as a valve with the valve seat washer and to prevent extraction of the valve stem. A secondary taper 74 on the outer end of the enlarged portion serves as a preliminary valve when the valve stem is retracted.

Thus when the valve 59 is turned all the way in the passage 60 is closed and the space above the valve disk is vented through a passageway 61 to the atmosphere through the now open valve seat washer 66 and the mating threads of the gland nut and valve stem at 68. This is the position used after the valve disk 40 is seated and when the service man is removing the safety valve 13.

After the relief valve has been repaired, it is desirable to test its operation and to equalize the pressure on either side of the valve disk 40 so that the valve is relieved of a superior closing pressure if the relief valve installation or repair is satisfactory. For this purpose, the valve 59 is turned all the way out and gas may flow through restricted passages 60 and 61 in manifold 1 to equalize pressures on opposite sides of the valve disk 4. If the relief valve installation is not satisfactory the continuing lower pressure on the downstream side of the valve disk due to restricted flow past the restriction pin 70 will permit a higher pressure to exist on the upstream side of the valve to prevent opening of the valve until the relief valve operation is satisfactory.

Thus, it is seen that this invention provides an improved relief valve manifold with a positive valving means to assist and safeguard the mechanic in making repairs or replacing relief valves on large gas storage tanks. The invention has also provided a relief valve manifold in which it is not possible for the mechanic to seal off more than one relief valve at a time, thus maintaining the required relief capacity for the tank.

What is claimed is:

1. A relief valve manifold for mounting on gas storage tanks comprising a throat section, a body section flaring outwardly from the throat section and terminating in an enclosing end member, said end member being provided with a plurality of passages extending from the interior to the exterior of the manifold, a bleeder valve by-passing each passage, means to mount a relief valve in each of the end member passages, a single valve means positioned interiorly of the manifold and adjacent the end member for selectively closing any one of said passages, valve stem means extending through the end member and interconnected with said valve means, and means located exteriorly of the manifold for rotating the valve stem to move said valve means to a selected position.

2. A relief valve manifold for mounting on gas storage tanks comprising means to mount said manifold on a tank, means to carry a plurality of normally closed relief valves on said manifold for relieving excessive tank pressures, valve means carried by and movable within said manifold to selectively seal off a relief valve from the manifold, bleeder valve means by-passing said valve means, means exterior to the manifold and interconnected with the valve means for moving said valve means to a selected position, and means within said manifold for positively positioning said valve means.

3. A relief valve manifold for mounting on gas storage tanks comprising means to mount said manifold on a tank, means to carry a plurality of relief valves on said manifold for relieving excessive tank pressures, valve means carried by and movable within said manifold to selectively seal off a relief valve from the manifold, means exterior to the manifold and interconnected with the valve means for actuating said valve means to a selected position, and camming means within said manifold for displacing said valve means towards said relief valve at said selected position.

4. A relief valve manifold for mounting on gas storage tanks comprising a mounting flange, a throat section extending from said flange, a body section flaring outwardly from said throat section, an end member being provided with a plurality of symmetrically positioned through passages, a bushing secured in each passage of the end member, the inner end of said bushing defining a valve seat inwardly of the end member, an upstanding boss integral with the end member and surrounding each of the passages for carrying a relief valve, a valve stem extending through a passage in the end member at the radial center of said symmetrically spaced passages, means connected to the valve stem exteriorly of the manifold to rotate said valve stem, means to normally bias said valve stem outwardly of the manifold, valving means within the manifold connected with the interior end of the valve stem, and means integral with the interior of the end member and cooperating with said valve stem biasing means to positively position said valve means selectively on said bushing valve seats and in inoperative positions.

5. A relief valve manifold for mounting on gas storage tanks comprising a mounting flange, a throat section extending from said flange, a body section flaring outwardly from said throat section, an end member closing off said body section, said end member being provided with a plurality of symmetrically positioned through passages, a bushing secured in each passage of the end member, the inner end of said bushing defining a valve seat inwardly of the end member, an upstanding boss integral with the end member and surrounding each of the passages for carrying a relief valve, a valve stem extending through a passage in the end member at the radial center of said symmetrically spaced passages, means connected to the valve stem exteriorly of the manifold to rotate said valve stem, means to normally bias said valve stem outwardly of the manifold, a lever pivotally connected adjacent at one end to the interior end of the valve stem, a valve disk carried by the other end of said lever with a limited pivotal relation thereto, a pair of cam raceways integral with the inner surface of the end member, and rollers mounted on the lever, one on each side of the pivotal connection between the stem and the lever, said rollers engaging said raceways to cooperate with said valve stem biasing means when the valve stem is rotated to positively position said valve disk selectively on said bushing valve seats and in inoperative positons.

6. A relief valve manifold for mounting on gas storage tanks comprising a mounting flange, a throat section extending from said flange, a body section flaring outwardly from said throat section, an end member closing off said body section, said end member being provided with a plurality of symmetrically positioned through passages, a bushing secured in each passage of the end member, the inner end of said bushing defining a valve seat inwardly of the end member, an upstanding boss integral with the end member and surrounding each of the passages for carrying a relief valve, a valve stem extending through a passage in the end member at the radial center of said symmetrically spaced passages, means connected to the valve stem exteriorly of the manifold to rotate said valve stem, means to normally bias said valve stem outwardly of a manifold, a lever pivotally connected adjacent to one end to the interior end of the valve stem, a valve disk carried by the other end of said lever with a limited pivotal relation thereto, a raceway integral with the inner surface of the end member, rollers mounted on the lever, one on each side of the pivotal connection between the stem and the lever, said rollers engaging said raceway to cooperate with said valve stem biasing means when the valve stem is rotated to positively position said valve disk selectively on said bushing valve seats and in inoperative positions, and a valve mounted on the manifold adjacent to each relief valve controlling gas flow through a set of by-pass passages in the manifold for equalization of gas pressures on either side of the valve disk.

7. A relief valve manifold for mounting on gas storage tanks comprising a unitary structure including a mounting means, a body section and an end member closing the body section, said end member having circumferentially and symmetrically positioned passages and a central passage therethrough, means to mount a relief valve in the circumferential passages of the end member, a valve stem extending through the central passage and protruding from either side of the end member, means secured to the outer protruding end of the stem for rotating said stem, means positioned between said stem rotating means and the end member for biasing the stem axially outward of the manifold, a lever pivotally connected adjacent to one end to the inner protruding end of the valve stem, a valve disk carried by the other end of said lever with a limited pivotal relation thereto, cam raceways of different radii integral with the inner surfaces of the end member, and rollers mounted on the lever, one on each side of the pivotal connection between the stem and the lever, said rollers engaging said raceways to cooperate with said valve stem biasing means to positively position said valve disk selectively in sealing relation to said circumferential passages and in operative positions.

8. A relief valve manifold with a plurality of relief valves mounted thereon with coplanar valve seats comprising a single valve means rotatably mounted interiorly of the manifold to move from one relief valve to another in a plane parallel to the plane of said valve seats for selectively sealing off any one of the relief valves, and means located exteriorly of said manifold and being inter-connected with said valve means for rotating said valve means to a selected position and means for moving the valve means in an axial direction at said valve seats.

9. A relief valve manifold with a plurality of relief valves mounted thereon comprising a single valve means positioned interiorly of the manifold for selectively sealing off any one of the relief valves, valve stem means extending through the manifold from the interior to the exterior thereof in journalled relationship including a lever connected at its interior end to said valve means, means connected to the valve stem means exteriorly of the manifold for rotating said valve means to a selected position, and means for operating said lever at said selected position for raising and lowering said valve means.

10. A relief valve manifold for mounting on gas storage tanks, comprising means to mount said manifold on a tank, means to carry a plurality of normally closed pressure relief valves on said manifold for relieving excessive tank pressures, valve means carried by and movable within said manifold to selectively seal off a relief valve from the manifold, bleeder valve means bypassing said valve means for equalizing pressures on opposite sides of said valve means, and means exterior to the manifold and interconnected with the valve means for moving said valve means to a selected position.

11. A relief valve manifold for mounting on gas storage tanks comprising means to mount said manifold on a tank, body means having a plurality of passages and adapted to carry a plurality of symmetrically spaced normally closed relief valves on said manifold at the outlets of said passages for relieving excessive tank pressures, bushings in said passages defining coplanar valve seats, valve means carried by and movable within said manifold to selectively engage said valve seats and seal off a relief valve from the manifold including an element supporting the valve means for moving said valve means in a plane parallel to the plane of said valve seats between said valve seats, means within said manifold for positively positioning said valve means and means for moving said valve means in a direction transverse to said parallel plane at said valve seats.

12. A relief valve manifold for mounting on gas storage tanks comprising means to mount said manifold on a tank, means to carry a plurality of symmetrically spaced relief valves on said manifold for relieving excessive tank pressures, valve means including a flat valve disc carried by and movable within said manifold to selectively seal off a relief valve from the manifold, means exterior to the manifold and interconnected with the valve means for moving said valve means in the plane of said valve disc to a selected position, and camming means within said manifold for displacing said valve means in a direction transverse to said plane.

References Cited in the file of this patent

UNITED STATES PATENTS

| | | |
|---|---|---|
| 619,867 | Cook | Feb. 21, 1899 |
| 1,550,943 | Baker | Aug. 25, 1925 |
| 2,040,930 | Frisch | May 19, 1936 |
| 2,530,295 | Fantz | Nov. 14, 1950 |